United States Patent
Miyamoto et al.

(10) Patent No.: US 9,738,320 B2
(45) Date of Patent: Aug. 22, 2017

(54) VEHICLE BODY FRONT STRUCTURE

(71) Applicant: HONDA MOTOR CO., LTD., Minato-ku, Tokyo (JP)

(72) Inventors: Hiroki Miyamoto, Wako (JP); Ken Yasui, Wako (JP); Eisei Higuchi, Wako (JP); Eri Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/116,677

(22) PCT Filed: Jan. 28, 2015

(86) PCT No.: PCT/JP2015/052281
§ 371 (c)(1),
(2) Date: Aug. 4, 2016

(87) PCT Pub. No.: WO2015/122276
PCT Pub. Date: Aug. 20, 2015

(65) Prior Publication Data
US 2016/0347374 A1    Dec. 1, 2016

(30) Foreign Application Priority Data
Feb. 12, 2014 (JP) .................. 2014-024671

(51) Int. Cl.
*B62D 21/15* (2006.01)
*B62D 25/08* (2006.01)
(Continued)

(52) U.S. Cl.
CPC .............. *B62D 21/152* (2013.01); *B60K 5/04* (2013.01); *B60K 5/1216* (2013.01); *B60R 19/26* (2013.01);
(Continued)

(58) Field of Classification Search
CPC ..... B62D 21/152; B62D 25/08; B62D 25/082
See application file for complete search history.

(56) References Cited

U.S. PATENT DOCUMENTS 8,517,453 B2    8/2013  Yoshida
8,596,711 B2 *  12/2013 Yasui ............... B60R 19/34
                                                  296/187.09
(Continued)

FOREIGN PATENT DOCUMENTS

CN    2774889 Y    4/2006
CN    102229348 A  11/2011
(Continued)

OTHER PUBLICATIONS

Office Action dated May 2, 2017 issued in the corresponding Chinese patent application 201580007805.1.
(Continued)

*Primary Examiner* — Gregory Blankenship
(74) *Attorney, Agent, or Firm* — Carrier Blackman & Associates, P.C.; Joseph P. Carrier; William D. Blackman

(57) ABSTRACT

A vehicle body front structure includes left and right front side frames including at least left and right front bending portions, left and right middle bending portions, and left and right rear bending portions. The left and right front bending portions are bent to project inwards in a vehicle's width direction by a collision load exerted on a front end of a vehicle body, whereby the left and right front bending portions restrain a power unit. The left and right middle bending portions are situated spaced apart to the rear from the left and right front bending portions. The left and right rear bending portions are situated spaced apart to the rear from the left and right middle bending portions, are bent outwards in the vehicle's width direction, and absorb colli-
(Continued)

sion energy when struck by the power unit moved rearward together with the left and right front bending portions.

5 Claims, 14 Drawing Sheets

(51) Int. Cl.
  *B60K 5/04* (2006.01)
  *B60K 5/12* (2006.01)
  *B60R 19/26* (2006.01)
  *B62D 25/14* (2006.01)

(52) U.S. Cl.
  CPC ........... *B62D 25/082* (2013.01); *B62D 25/14* (2013.01); *B60Y 2306/01* (2013.01)

(56) References Cited

U.S. PATENT DOCUMENTS

| | | | |
|---|---|---|---|
| 2011/0309655 A1* | 12/2011 | Mori | B62D 21/152 296/187.09 |
| 2012/0152675 A1* | 6/2012 | Mori | F16F 7/12 188/377 |
| 2012/0153679 A1 | 6/2012 | Yasuhara et al. | |
| 2012/0248820 A1 | 10/2012 | Yasui et al. | |
| 2012/0313398 A1 | 12/2012 | Shin et al. | |
| 2013/0320709 A1 | 12/2013 | Kuwabara et al. | |
| 2014/0015280 A1* | 1/2014 | Ohta | B62D 21/152 296/187.08 |
| 2014/0239671 A1* | 8/2014 | Mori | F16F 7/12 296/187.09 |
| 2015/0307134 A1* | 10/2015 | Hirota | B62D 25/082 296/187.09 |
| 2016/0347374 A1* | 12/2016 | Miyamoto | B62D 21/152 |
| 2016/0362139 A1* | 12/2016 | Sekiguchi | B62D 21/152 |
| 2017/0113726 A1* | 4/2017 | Matsushima | B62D 21/152 |
| 2017/0113727 A1* | 4/2017 | Nakamoto | B62D 25/082 |
| 2017/0113735 A1* | 4/2017 | Kawabe | B62D 25/08 |

FOREIGN PATENT DOCUMENTS

| | | |
|---|---|---|
| CN | 202294968 U | 7/2012 |
| JP | S61-016221 U | 1/1986 |
| JP | 3617481 B2 | 2/2005 |
| JP | 4276185 B2 | 6/2009 |
| JP | 2010-221991 A | 10/2010 |
| JP | 2012-035759 A | 2/2012 |
| JP | 5029328 B2 | 9/2012 |
| JP | 2012214211 A | 11/2012 |
| JP | 5288000 B2 | 9/2013 |
| JP | 2013203320 A | 10/2013 |
| WO | 2011/027633 A1 | 3/2011 |

OTHER PUBLICATIONS

Office Action dated Dec. 20, 2016 in the corresponding Japanese Patent Application No. 2015-562776.
PCT/ISA/210 from PCT/JP2015/052281.

\* cited by examiner

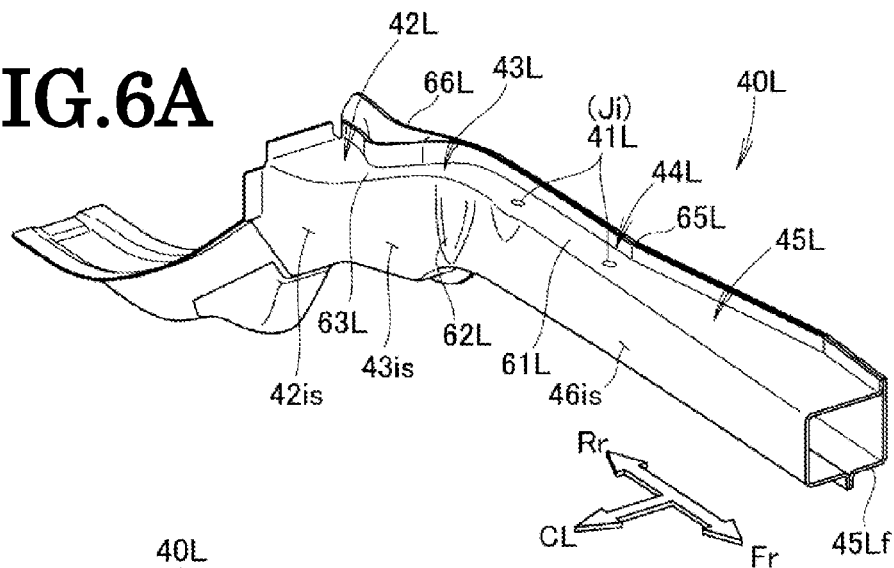
FIG.6A
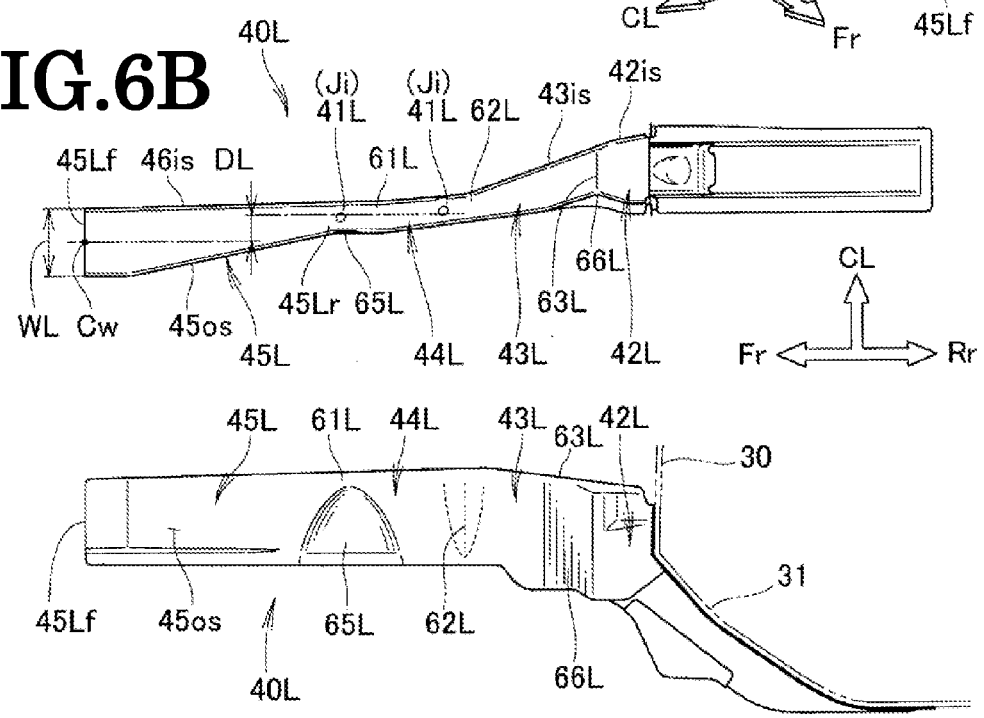
FIG.6B
FIG.6C

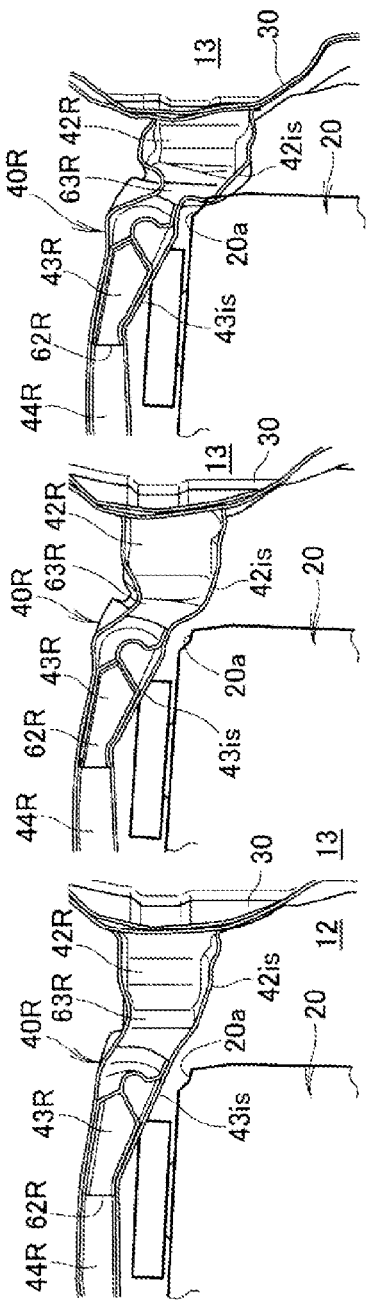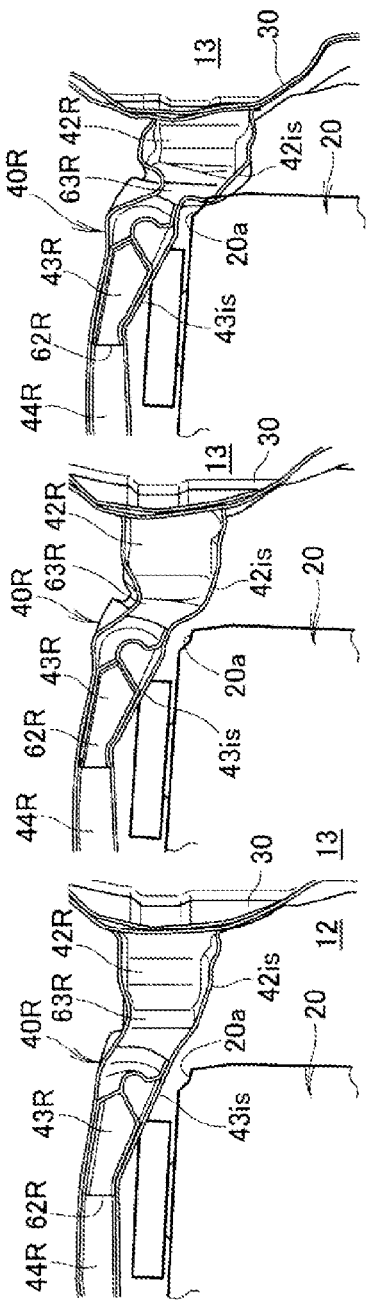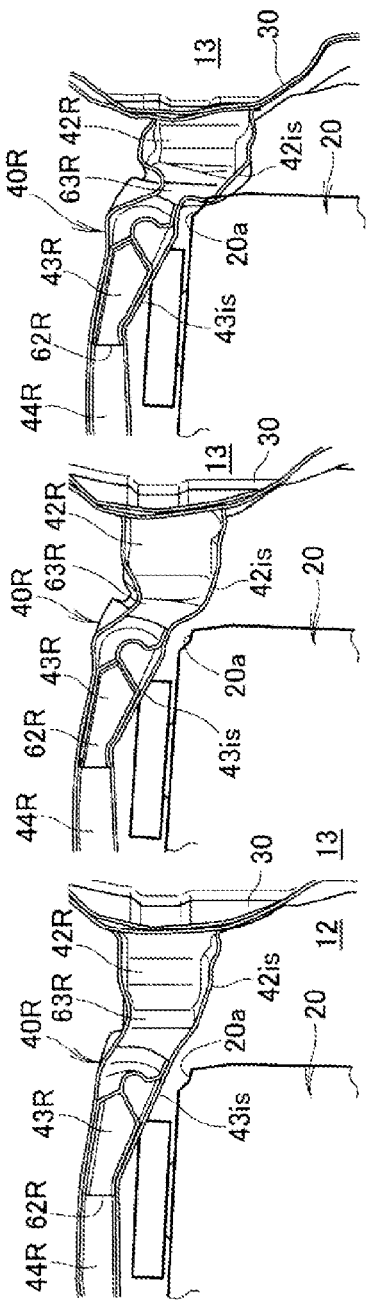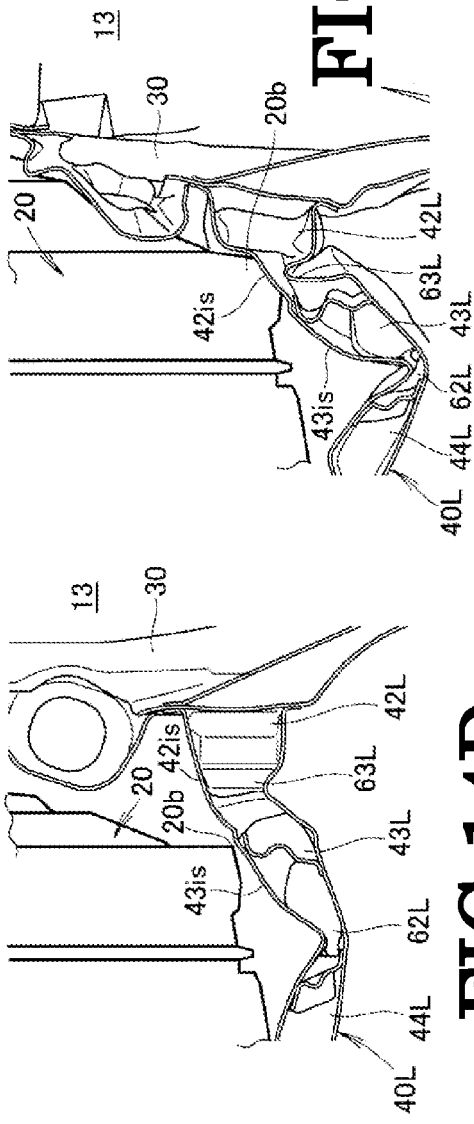

VEHICLE BODY FRONT STRUCTURE

TECHNICAL FIELD

The present invention relates to a vehicle body front structure having improved left and right front side frames on which a power unit can be mounted.

BACKGROUND ART

A general wheeled vehicle such as a motor vehicle has left and right front side frames at a front portion of a vehicle body. The left and right side frames extend to the front of the vehicle body from a dashboard lower panel, and a power unit such as an engine can be mounted on the left and right side frames.

The left and right side front side frames can be deformed plastically by means of a collision load (a frontal collision load) that is exerted on a front end of the vehicle body from the front. As this occurs, the power unit is displaced towards the rear of the vehicle body to strike the dashboard lower panel. To deal with this, it is required to enhance an occupant protection performance of protecting an occupant who is seated behind the dashboard lower panel in a passenger compartment. In order to enhance the occupant protection performance, patent literatures 1 to 5 disclose the known techniques in relation to a front structure of a vehicle body that restrain the dashboard lower panel from being deformed into the passenger compartment.

In a vehicle body front structure that is known through patent literature 1, a so-called transverse engine that is elongated in a vehicle's width direction is positioned between left and right front side frames. Left and right recess portions are formed on side surfaces of the left and right front side frames, respectively. The left and right front side frames are bent inwards in the vehicle's width direction by means of the frontal collision load to strike the engine. As a result of this, impact or collision energy in an initial stage of the collision is absorbed by the left and right front side frames and the engine.

In a vehicle body front structure that is known through patent literature 2, a so-called transverse power unit that is elongated in a vehicle's width direction is positioned between left and right front side frames. The power unit is mounted on the left and right front side frames. Left and right recess portions are formed on side surfaces of the left and right front side frames, respectively. The left and right front side frames are bent inwards in the vehicle's width direction by means of a frontal collision load to strike the power unit. As a result of this, impact or collision energy in an initial stage of the collision is absorbed by the left and right front side frames and the power unit.

A vehicle body front structure that is know through patent literature 3 is a similar technique to that disclosed by patent literature 2, and left and right brittle portions are formed on side surfaces of left and right front side frames. The left and right front side frames are bent inwards in the vehicle's width direction by means of a frontal collision load to strike the power unit. As a result of this, impact or collision energy in an initial stage of the collision is absorbed by the left and right front side frames and the power unit.

In the vehicle body front structure known through patent literatures 1 to 3, however, in case the collision energy is not absorbed completely in the initial stage of the collision, the power unit is displaced towards the rear of the vehicle body to strike the dashboard lower panel. There still remains room for improvement in restraining the dashboard lower panel from being deformed into the passenger compartment by the frontal collision in a more ensured fashion.

In a vehicle body front structure that is known through patent literature 4, left and right dampers that support left and right front wheels in suspension are provided on left and right front side frames, respectively. The left and right side frames are bent outwards in a vehicle's width direction by means of a frontal collision load to strike left and right front pillars via the left and right dampers. As a result of this, impact or collision energy in an initial stage of the collision is absorbed by the left and right front side frames and the left and right front pillars. There is no clear description on how a power unit that is mounted on the left and right front side frames acts. In the case of the power unit being displaced towards the rear of a vehicle body, there is the possibility that the power unit strikes a dashboard lower panel.

In a vehicle body front structure that is known through patent literature 5, a so-called transverse power unit that is elongated in a vehicle's width direction is positioned between left and right front side frames. The power unit is mounted on a subframe. The subframe is suspended from lower end portions of the left and right front side frames at a front end portion and a rear end portion thereof. In portions of the left and right front side frames, portions lying rearwards of the portions where the power unit is mounted, that is, left and right rearward portions are inclined inwards in the vehicle's width direction as the left and right front side frames extend towards the rear of the vehicle body. Left and right mounting brackets are provided on inner surfaces of the left and right rearward portion in relation to the vehicle's width direction. The subframe is detachably coupled to the left and right mounting brackets via left and right coupling portions.

Front portions of the left and right front side frames are collapsed by means of the frontal collision load. Because of this, the subframe and the power unit that are situated below the left and right front side frames are displaced downwards and rearwards. The power unit is displaced to strike the left and right coupling portions to thereby detach the left and right coupling portions from the left and right mounting brackets, respectively. As a result of this, the subframe is detached from the left and right mounting brackets. The power unit continues to be displaced rearwards and downwards by means of the frontal collision load and then strike the left and right mounting brackets. This collapses the left and right mounting brackets. In addition, the collapsing actions of the left and right front side frames has continued since a point in time when the frontal collision load started to be exerted on the left and right front side frames. Thus, the collision energy is absorbed.

Thus, in the vehicle body front structure that is known through patent literature 5, the collision energy is absorbed by collapsing the left and right mounting brackets by the rear-moving power unit. Absorbing the collision energy sufficiently requires the enlargement in size of the left and right mounting brackets where the subframe is coupled and increases the weight of the vehicle body. Moreover, the vehicle body front structure that is known through patent literature 5 is the configuration that is applicable only to the case where the left and right mounting brackets where the subframe is coupled are provided.

RELATED ART LITERATURE

Patent Literature

Patent Literature 1: JP-UM-A-S61-16221
Patent Literature 2: JP-B-5288000

Patent Literature 3: JP-B-3617481
Patent Literature 4: JP-B-5029328
Patent Literature 5: JP-B-4276185

SUMMARY OF THE INVENTION

Problem that the Invention is to Solve

A problem that the invention is to solve is to provide a technique that can more properly restrain a dashboard lower panel from being deformed into a passenger compartment by means of a collision load (a frontal collision load) that is exerted on a front end of a vehicle body from the front and with a simple configuration.

Means for Solving the Problem

According to an invention of claim 1, there is provided a vehicle body front structure including:

a dashboard lower panel that separates a power unit compartment defined at a front portion of a vehicle body so as to accommodate a power unit from a passenger compartment which is situated directly behind the power unit compartment;

left and right front side frames that extend to the front of the vehicle body from the dashboard lower panel, and that enables to mount the power unit thereon by means of left and right mount portions; and a front bumper beam that is attached to stretch between front ends of the left and right front side frames, wherein the left and right front side frames have at least three left and right bending portions including left and right front bending portions, left and right middle bending portions which are situated spaced apart to the rear from the left and right front bending portions, and left and right rear bending portions which are situated spaced apart to the rear from the left and right middle bending portions, the left and right front bending portions are restraint sections that enable to restrain the power unit by holding the power unit from both sides thereof in a vehicle's width direction while absorbing collision energy by being bent to project inwards in the vehicle's width direction by means of a collision load exerted on a front end of the vehicle body from the front, the left and right rear bending portions are energy absorbing sections that enable to absorb the collision energy by being bent outwards in the vehicle's width direction by means of the collision load and being struck by the power unit which is moved rearward together with the left and right front bending portion by means of the collision load, and the left and right middle bending portions are bending assistance sections that enable to be bent outwards in the vehicle's width direction so as to allow the bending of the left and right front bending portions and the left and right rear bending portions.

As will be described under claim 2, it is preferable that the left and right front bending portions are set at fastening positions of the left and right front side frames where left and right mounting brackets of the left and right mount portions are fastened with a bolt or are set in the vicinity of the fastening positions, and left and right attaching positions of the front bumper beam which is attached to the left and right side frames are offset outwards in the vehicle's width direction with respect to the left and right fastening positions.

As will be described under claim 3, it is preferable that the left and right front side frames include left and right front end portions which extend from front ends to the fastening positions or to the vicinity of the fastening positions, and left and right adjacent portions which lie adjacent to rear ends of the left and right front end portions and which are less rigid than the left and right front end portions, the left and right front bending portions are situated at boundaries between the left and right front end portions and the left and right adjacent portions, outer side surfaces of the left and right front end portions in the vehicle's width direction are inclined outwards in the vehicle's width direction as they extend from rear ends of the left and right front end portions towards the front of the vehicle body, whereby widths of the left and right front end portions gradually increase from the rear ends of the left and right front end portions towards the front of the vehicle body, and the left and right front attaching positions of the front bumper beam are set individually at widthwise centers of front ends of the left and right front end portions.

As will be described under claim 4, it is preferable that the left and right front side frames include left and right proximal end portions which are joined to the dashboard lower panel, and left and right inclined portions which are inclined outwards in the vehicle's width direction as they extend from the left and right proximal end portions towards the front of the vehicle body, at least a part of inner side surfaces of the left and right inclined portions in the vehicle's width direction overlaps the power unit in a longitudinal direction of the vehicle body as seen from the front of the vehicle body, and the left and right rear bending portions are situated at boundaries between the left and right proximal end portions and the left and right inclined portions.

As will be described under claim 5, it is preferable that the left and right front side frames have vertical grooves which are formed on outer side surfaces of the left and right front side frames in the vehicle's width direction, and the left and right front bending portions and the left and right rear bending portions are sections formed brittle by the vertical grooves of the left and right front side frames.

Advantage of the Invention

In the invention according to claim 1, the front bumper beam is attached to stretch between the front ends of the left and right front side frames. The left and right front bending portions are bent so as to project inwards in the vehicle's width direction by means of the collision load exerted on the front end of the vehicle body from the front, that is, the frontal collision load, whereby the left and right front bending portions restrain the power unit by holding it from both the sides thereof in the vehicle width's direction while absorbing the collision energy. Consequently, the moment produced by the collision load to attempt to rotate the power unit to the left or right relative to the left and right front side frames can be suppressed by the left and right front bending portions. Namely, in an initial stage of the collision, the front portions of the left and right front side frames are deformed plastically, whereby the power unit can be properly moved towards the rear of the vehicle body accordingly as the front portions of the left and right front side frames are deformed while absorbing the collision energy.

The left and right rear bending portions are bent outwards in the vehicle's width direction by means of the collision load, and when the power unit that is moved rearward together with the left and right front bending portion by means of the collision load strikes the left and right rear bending portions, the left and right rear bending portion absorbs the collision energy. Namely, in a late stage of the collision, rear portions of the left and right front side frames are deformed plastically, whereby the collision energy ban be absorbed further.

Thus, in the invention according to claim 1, the collision energy can be absorbed in the two stages of the initial stage and the late stage of the collision. Therefore, since the power unit is moved rearward by means of the collision load, the collision energy resulting when the power unit strikes the dashboard lower panel can be reduced. Consequently, it is more properly possible to restrain the dashboard lower panel from being deformed into the passenger compartment. It is possible to enhance further the occupant protection performance by ensuring the space inside the passenger compartment. Moreover, it is possible to absorb the collision energy sufficiently by the vehicle body with the simple configuration that has only the left and right front bending portions, the left and right middle bending portions, and the left and right rear bending portions to the left and right front side frames.

In general, there may be a situation in which left and right mount portions of the power unit are positioned differently in a longitudinal direction of the vehicle body. In this case, the left and right mount portions are mounted on the left and right front side frames in different positions. As a result, bending rigidities of the left and right front side frames may differ from each other.

In contrast with this, in the invention according to claim 1, in the initial stage of the collision, the front portions of the left and right front side frames holds the power unit from both the sides thereof in the vehicle's width direction to restrain the power unit, allowing the power unit to properly move towards the rear of the vehicle body. Thereafter, in the late stage of the collision, the rear portions of the left and right front side frames are deformed plastically by the power unit that is moved rearward to strike it. Therefore, although the bending rigidities of the left and right front side frames differ from each other, the deformation amount by which the dashboard lower panel is deformed into the passenger compartment can be reduced in an ensured fashion.

In the invention according to claim 2, the attaching positions of the front bumper beam to the left and right front side frames are offset outwards in the vehicle's width direction with respect to the left and right front bending portions, that is, the left and right fastening positions of the left and right mount portions. Therefore, the points of application of the collision load to the left and right front bending portions are offset outwards in the vehicle's width direction. Consequently, the left and right front bending portions can be properly bent inwards in the vehicle's width by the collision load. The power unit can be properly restrained by being held from both the sides thereof in the vehicle's width direction by the left and right front bending portions.

In the invention according to claim 3, the left and right front bending portions are situated in the fastening positions or in the vicinity of the fastening position, that is, at the boundaries between the left and right front end portions and the left and right adjacent portions. The outer side surfaces of the left and right front end portions in the vehicle's width direction are inclined outwards in the vehicle's width direction as they extend from the rear ends of the left and right front end portions to the front of the vehicle body. Therefore, the widths of the left and right front end portions increase gradually as they extend from the rear ends of the left and right front end portions towards the front of the vehicle body. The left and right attaching positions of the front bumper beam are set at the respective widthwise centers of the front ends of the left and right front end portions. Consequently, even though the power unit is positioned so as to be offset to lie nearer to the dashboard lower panel with respect to the overall length of the left and right front side frames, the left and right front bending portions are properly bent inwards in the vehicle's width direction by means of the collision load.

In the invention according to claim 4, at least the portions of the inner side surfaces in the vehicle's width direction of the left and right inclined portions that are situated at the rear portions of the left and right front side frames overlap the power unit in the longitudinal direction of the vehicle body when seen from the front of the vehicle body. The left and right rear bending portions are situated at the boundaries between the left and right proximal end portions and the left and right inclined portions. Therefore, the power unit that is moved rearward by means of the collision load strikes the left and right inclined portions, whereby the left and right rear bending portions can be properly bent outwards in the vehicle's width direction. Then, the rear portions of the left and right front side frames are collapsed by the power unit that is moved rearward, whereby the collision energy ban be absorbed sufficiently. Consequently, the collision energy absorbing performance by the rear portions of the left and right front side frames can be enhanced. As a result, in the late stage of the collision, the deformation amount by which the dashboard lower panel is deformed into the passenger compartment can be properly reduced.

In the invention according to claim 5, the left and right front bending portions and the left and right rear bending portions are the portions of the left and right front side frames that are formed brittle by providing the vertical grooves. The vertical grooves formed on the left and right front side frames can exhibit the notch effect. Therefore, in the left and right front side frames, the positions of the left and right front bending portions and the left and right rear bending positions can be properly set. Then, the left and right front bending portions and the left and right rear bending portions can be properly bent by means of the collision load with the respective vertical grooves acting as triggers (bending initiating points). Moreover, the bending can be realized only by the simple configuration of forming the vertical grooves on the left and right front side frames.

BRIEF DESCRIPTION OF THE DRAWINGS

FIGS. 6A-6C show configurations of the left front side frame alone shown in FIG. 5 including a configuration resulting when seen from an inner side in a vehicle's width direction and the front, a configuration resulting when seen from above, and a configuration resulting when seen from an outer side in the vehicle's width direction.

FIGS. 14A-14E shows a process of the power unit shown in FIG. 12 collapsing left and right rear bending portions.

MODE FOR CARRYING OUT THE INVENTION

A mode for carrying out the invention will be described below based on the accompanying drawings. When referred to, "front," "rear," "left," "right," "up," and "down" denote respective directions resulting when seen from a driver's position, and Fr, Rr, Le, Ri, and CL denote a front side, a rear side, a left side, a right side and a vehicle's width center, respectively.

EXAMPLE

Figure 1:
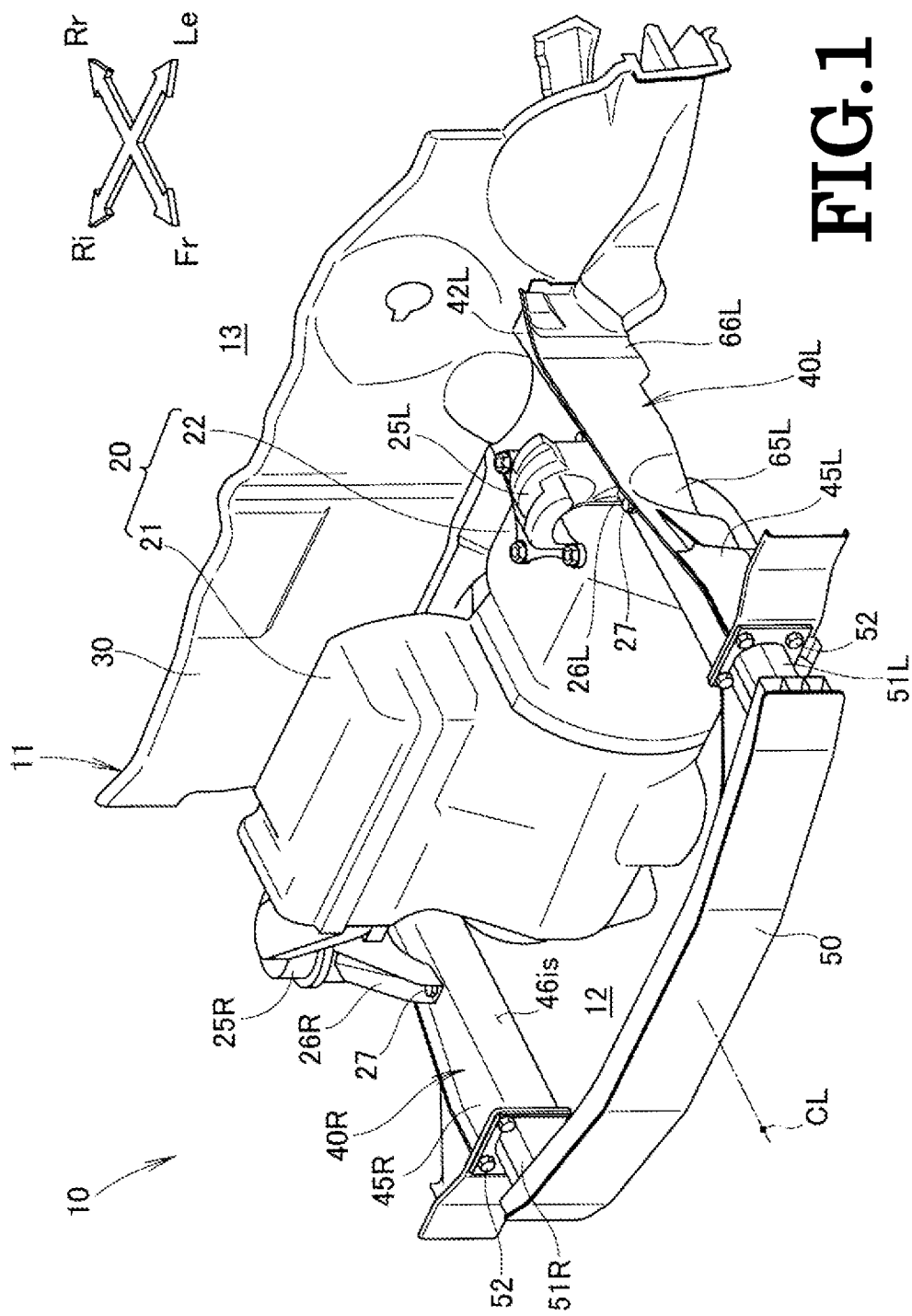
FIG. 1 is a perspective view of a front portion of a vehicle body according to the invention when seen from thereabove.
Figure 2:
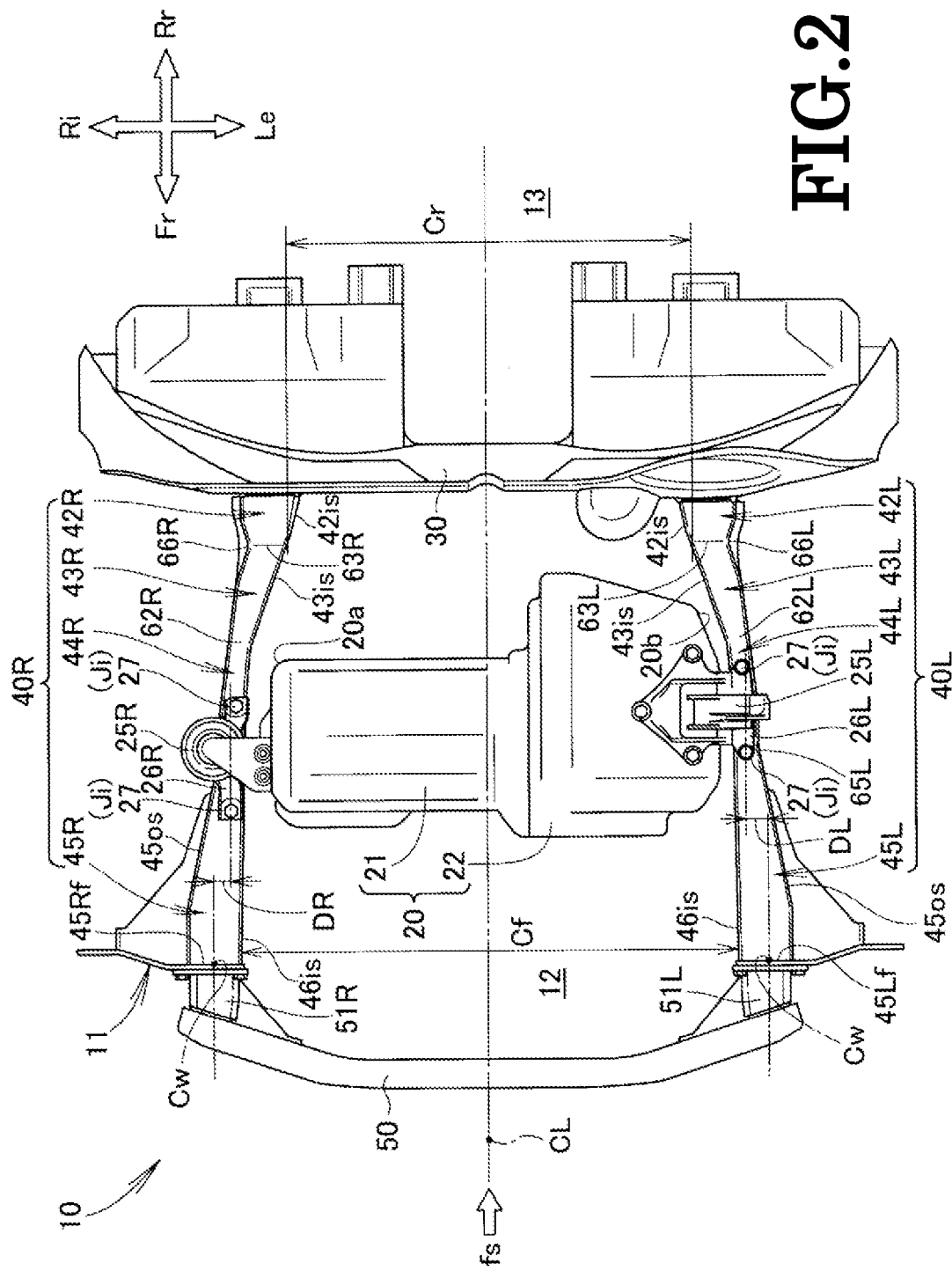
FIG. 2 is a plan view of the front portion of the vehicle body shown in FIG. 1.
Figure 3:
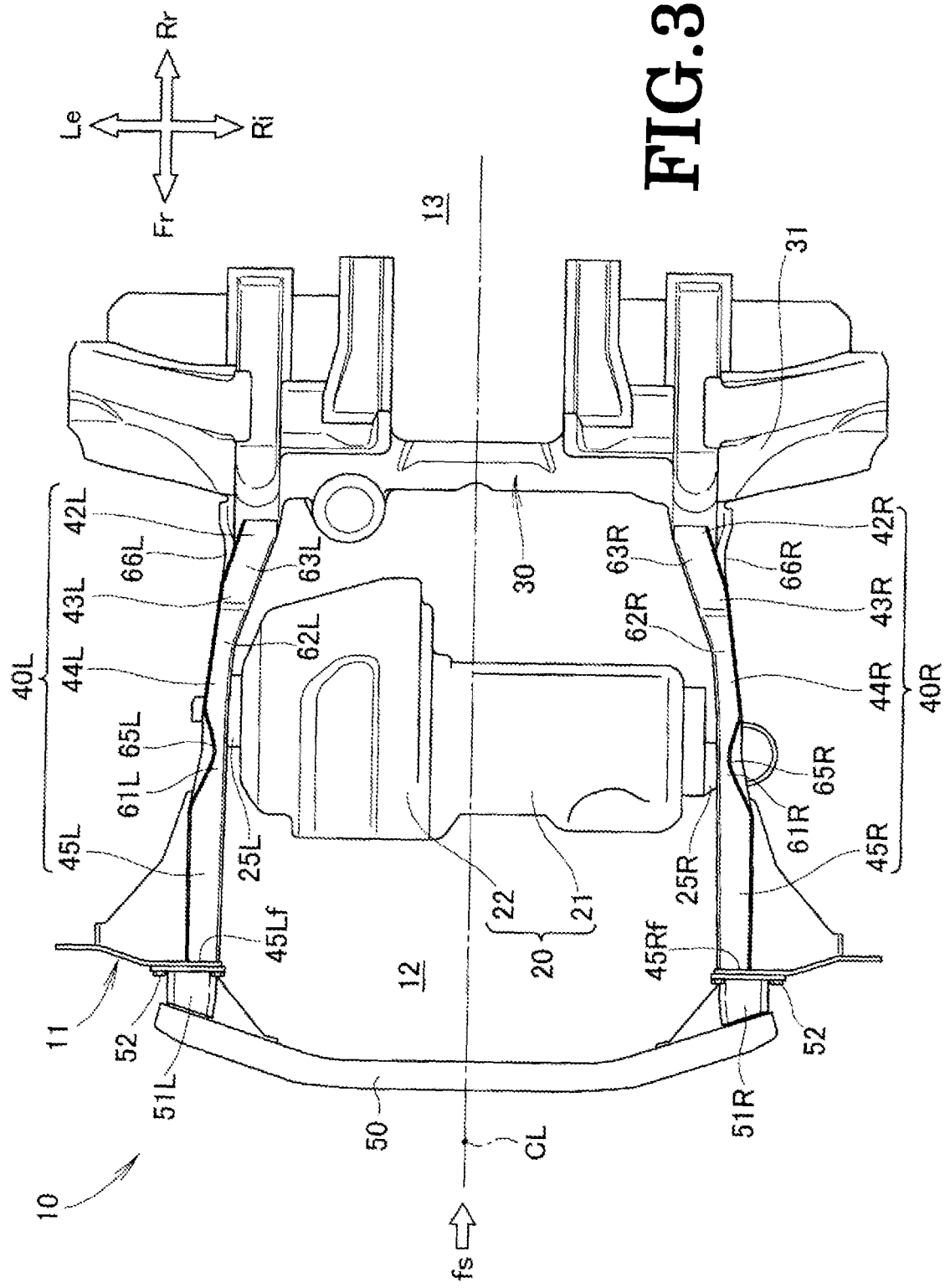
FIG. 3 is a bottom view of the front portion of the vehicle body shown in FIG. 1.
Figure 4:
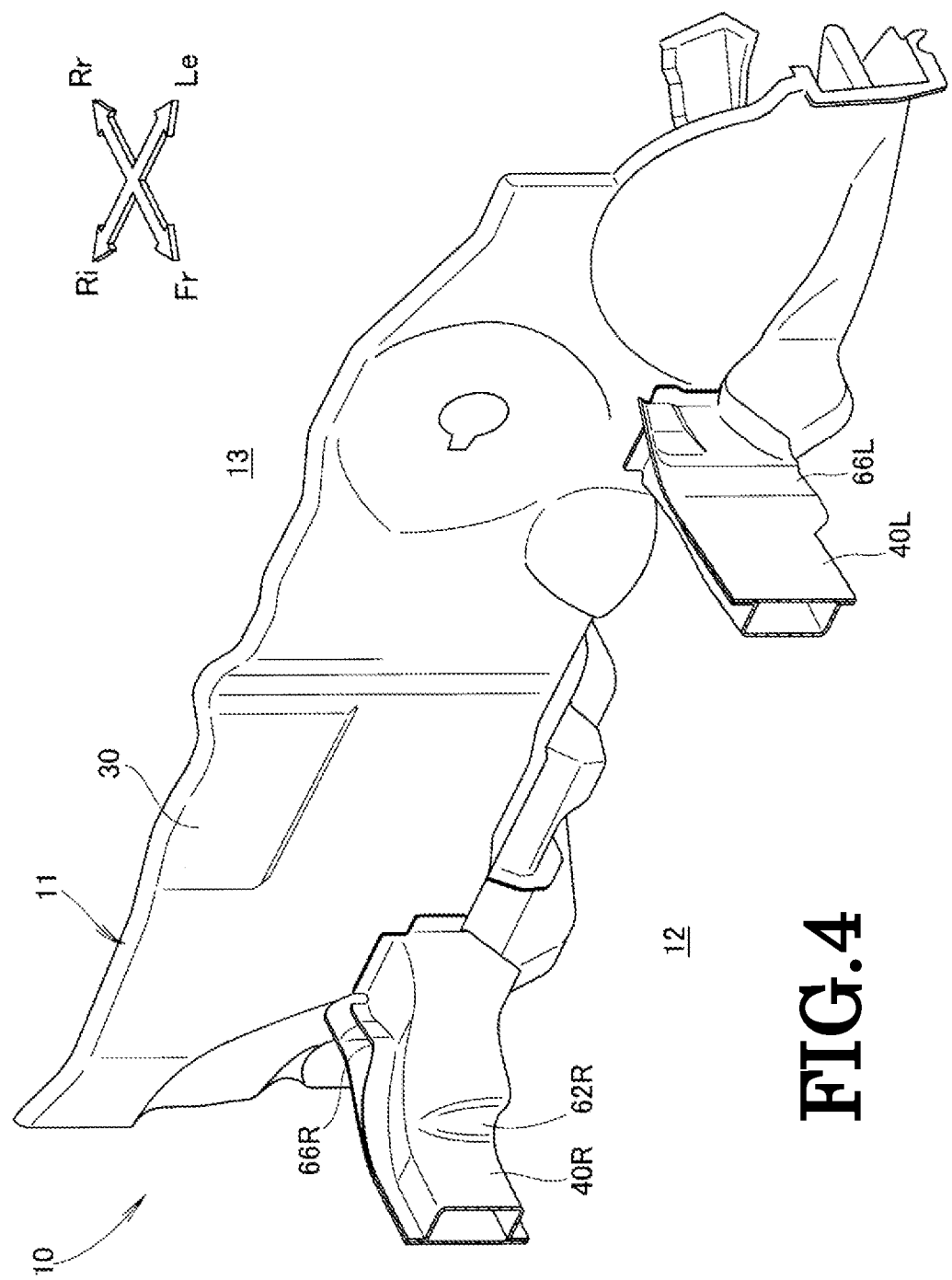
FIG. 4 is a perspective view showing a relationship between proximal end portions of left and right front side frames and a dashboard lower panel shown in FIG. 1.

A vehicle body front structure according to an example will be described. As shown in FIGS. 1 and 2, a wheeled vehicle 10 is a passenger vehicle. A front power unit compartment 12 and a passenger compartment 13 situated directly behind the power unit compartment 12 are formed inside a vehicle body 11 of the wheeled vehicle 10.

A power unit 20 is accommodated in the power unit compartment 12. The power unit 20 is a so-called transverse power unit in which an engine 21 and a transmission 22 are aligned with each other in a vehicle's width direction for connection.

As shown in FIGS. 1 to 4, the vehicle body 11 is made up of a monocoque body and is formed symmetrical with respect to a transverse center line CL that passes through a widthwise center of the wheeled vehicle 10 to extend along a longitudinal direction of the wheeled vehicle. A front portion of the vehicle body 11 includes a dashboard lower panel 30, left and right front side frames 40L, 40R, and a front bumper beam 50.

As shown in FIGS. 1 and 2, the dashboard lower panel 30 is a vertical plate-like bulkhead that separates the power unit compartment 12 from the passenger compartment 13.

As shown in FIGS. 1 and 2, the left and right front side frames 40L, 40R are elongated members that extend from the dashboard lower panel 30 towards the front of the vehicle body and are each made up of a hollow member (refer to FIG. 4) having a substantially rectangular cross section. The left and right front side frames 40L, 40R can mount thereon the power unit 20 via left and right mount portions 25L, 25R. To describe this in greater detail, left and right mounting brackets 26L, 26R of the left and right mount portions 25L, 25R rest on upper surfaces of the left and right front side frames 40L, 40R and are attached thereto at two front and rear portions with bolts 27. Front and rear bolt holes 41L, 41L, 41R, 41R (refer to FIGS. 5, 8) are formed through the upper surfaces of the left and right front side frames 40L, 40R, and the bolts 27 are passed through these bolt holes 41L, 41L, 41R, 41R.

As shown in FIG. 2, the engine 21 is situated closer to the front of the vehicle body 11 than the transmission 22. Therefore, the left and right mount portions 25L, 25R of the power unit 20 are situated in different positions in the longitudinal direction of the vehicle body. The left and right mount portions 25L, 25R are mounted on the left and right front side frames 40L, 40R in the different positions.

Figure 5:
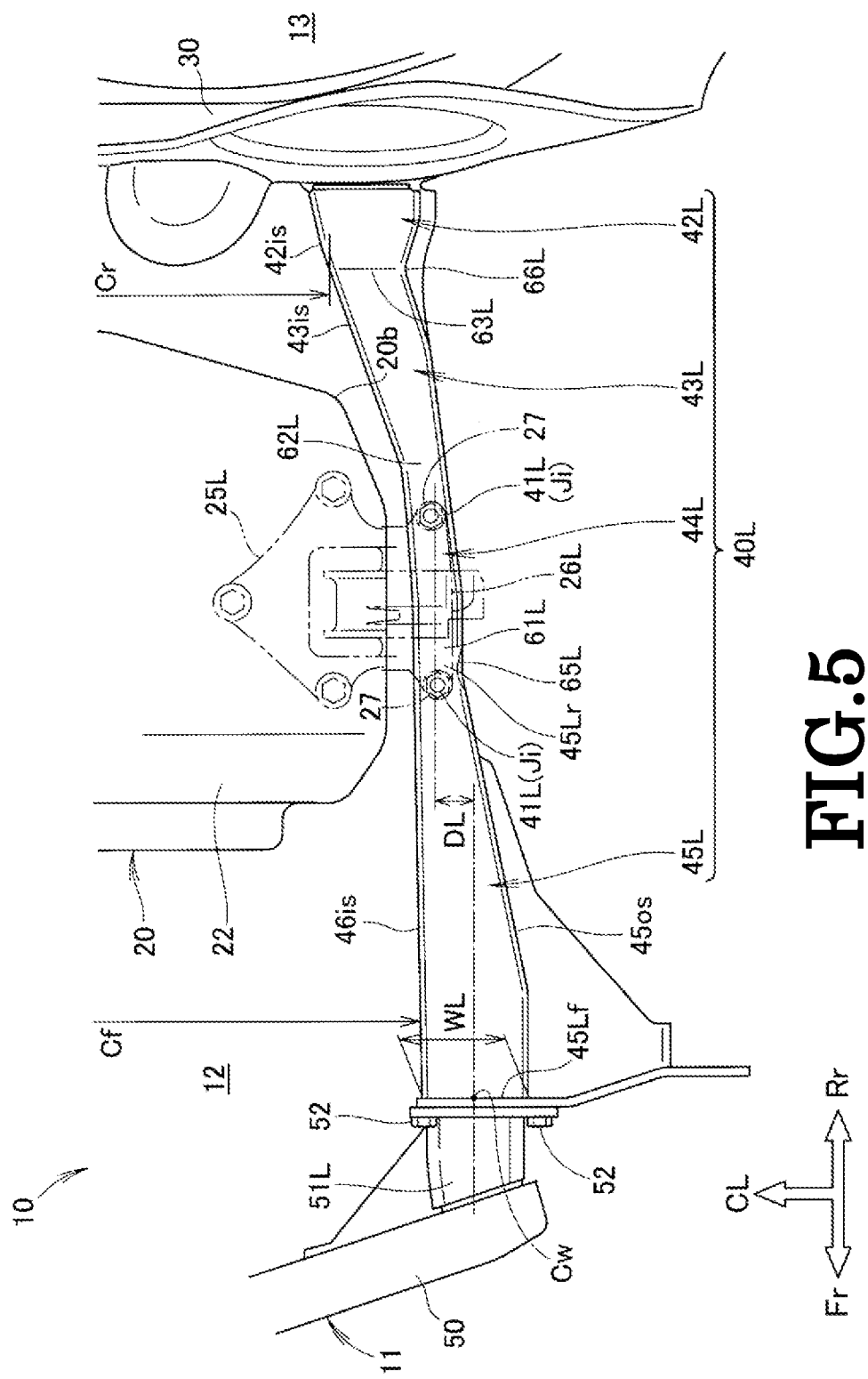
FIG. 5 is an enlarged view of the left front side frame shown in FIG. 2.
Figure 7:
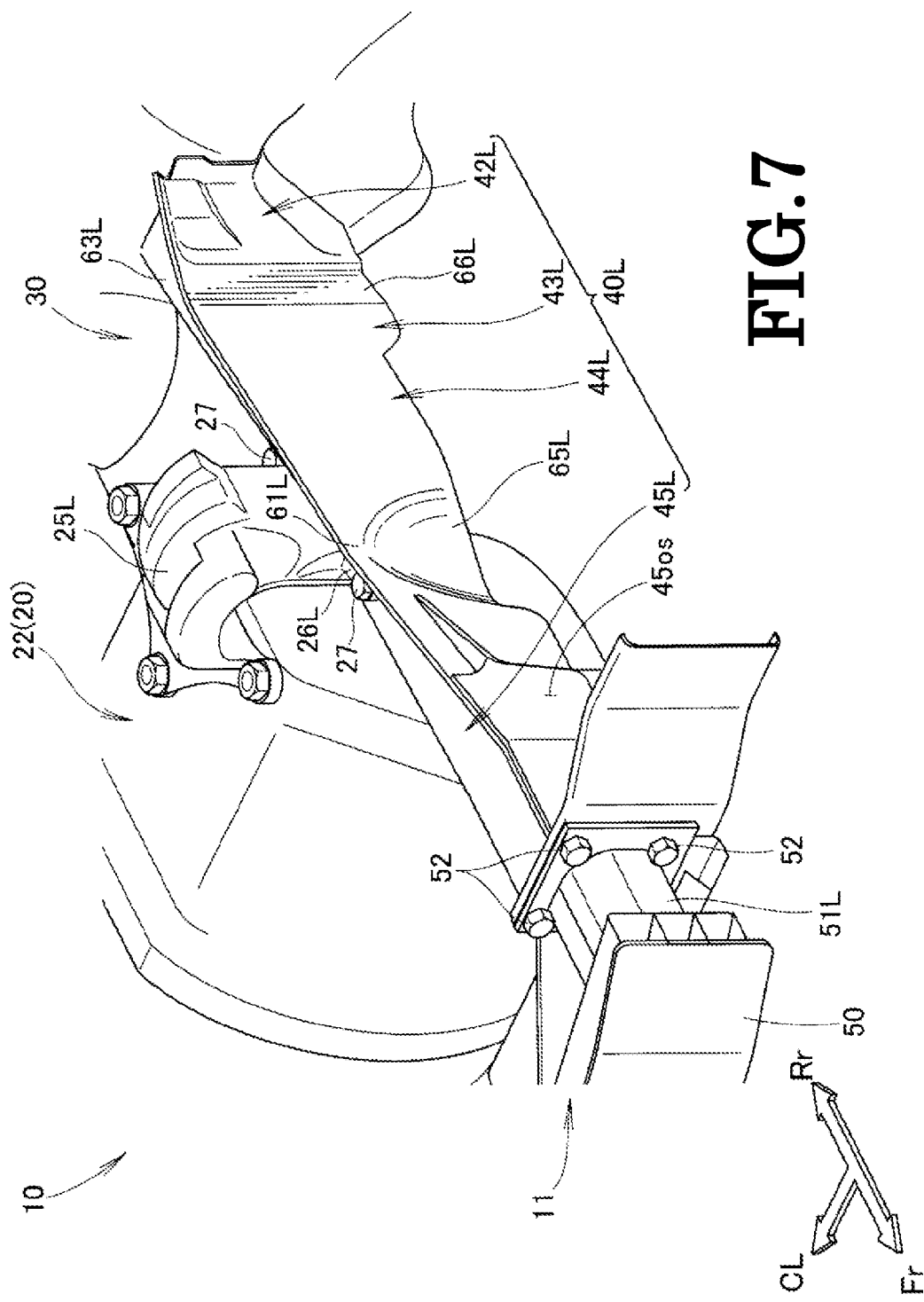
FIG. 7 is an enlarged view of the left front side frame shown in FIG. 1.

FIG. 5 is an enlarged view of the left front side frame 40L shown in FIG. 2. FIG. 6A is a perspective view of the left front side frame 40L alone shown in FIG. 5 that results when seen from an inner side in the vehicle's width direction and the front. FIG. 6B is an overall plan view of the left front side frame 40L shown in FIG. 5. FIG. 6C is a side view of the left front side frame 40L shown in FIG. 6B that results when seen from an outer side in the vehicle's width direction. FIG. 7 is an enlarged view of the left front side frame 40L shown in FIG. 1.

As shown in FIGS. 5 to 7, the left front side frame 40L includes a left proximal end portion 42L that is joined to the dashboard lower panel 30, a left rear end portion 43L that extends from a front end of the left proximal end portion 42L towards the front of the vehicle body 11, a left middle portion 44L that extends from a front end of the left rear end portion 43L towards the front of the vehicle body 11, and a left front end portion 45L that extends from a front end of the left middle portion 44L towards the front of the vehicle body 11.

The rigidity of the left rear end portion 43L is set to be smaller than the rigidity of the left proximal end portion 42L. The rigidity of the left middle portion 44L is set to be smaller than those of the left proximal end portion 42L, the left rear end portion 43L and the left front end portion 45L. Namely, the left proximal end portion 42L and the left rear end portion 43L constitute a rear high rigid portion. The left front end portion 45L constitutes a front high rigid portion. The left middle portion 44L constitutes a low rigid portion.

To describe this in detail, the left proximal end portion 42L is joined to a front surface of a lower end portion 31 (refer to FIG. 6C) of the dashboard lower panel 30 and extends towards the rear of the vehicle body 11 while being inclined rearwards and downwards along the lower end portion 31. An inner side surface 42is of the left proximal end portion 42L in the vehicle's width direction is inclined outwards in the vehicle's width direction as it extends from a rear end towards the front of the vehicle body 11.

The left rear end portion 43L is inclined outwards in the vehicle's width direction as it extends from the left proximal end portion 42L towards the front of the vehicle body 11. Hereinafter, the left rear end portion 43L will be referred to as a "left inclined portion 43L" as required.

An inner side surface 46is of the left front side frame 40L in the vehicle's width direction that extends from a front end of the left inclined portion 43L to a front end 45Lf of the left front end portion 45L is formed into a straight flat plate that substantially (basically) continues in the longitudinal direction of the vehicle body.

The front end 45Lf of the left front end portion 45L is situated at a front end of the left front side frame 40L. As has been described heretofore, the left front end portion 45L extends from the front end 45Lf of the left front side frame 40L to a front end of the left middle portion 44L. An outer side surface 45os of the left front end portion 45L in the vehicle's width direction is inclined outwards in the vehicle's width direction as it extends from a rear end 45Lr of the left front end portion 45L, that is, a front end of the left middle portion 44L towards the front of the vehicle body 11. Consequently, a width WL (a transverse width WL) of the left front end portion 45L increases gradually of the left front end portion 45L extends from the rear end 45Lr towards the front of the vehicle body 11.

The left middle portion 44L lies adjacent to the rear end 45Lr of the left front end portion 45L as described above. The left middle portion 44L is the portion whose rigidity is lower than that of the left front end portion 45L as described above. Hereinafter, the left middle portion 44L will be referred to as a "left adjacent portion 44L" as required.

Figure 8:
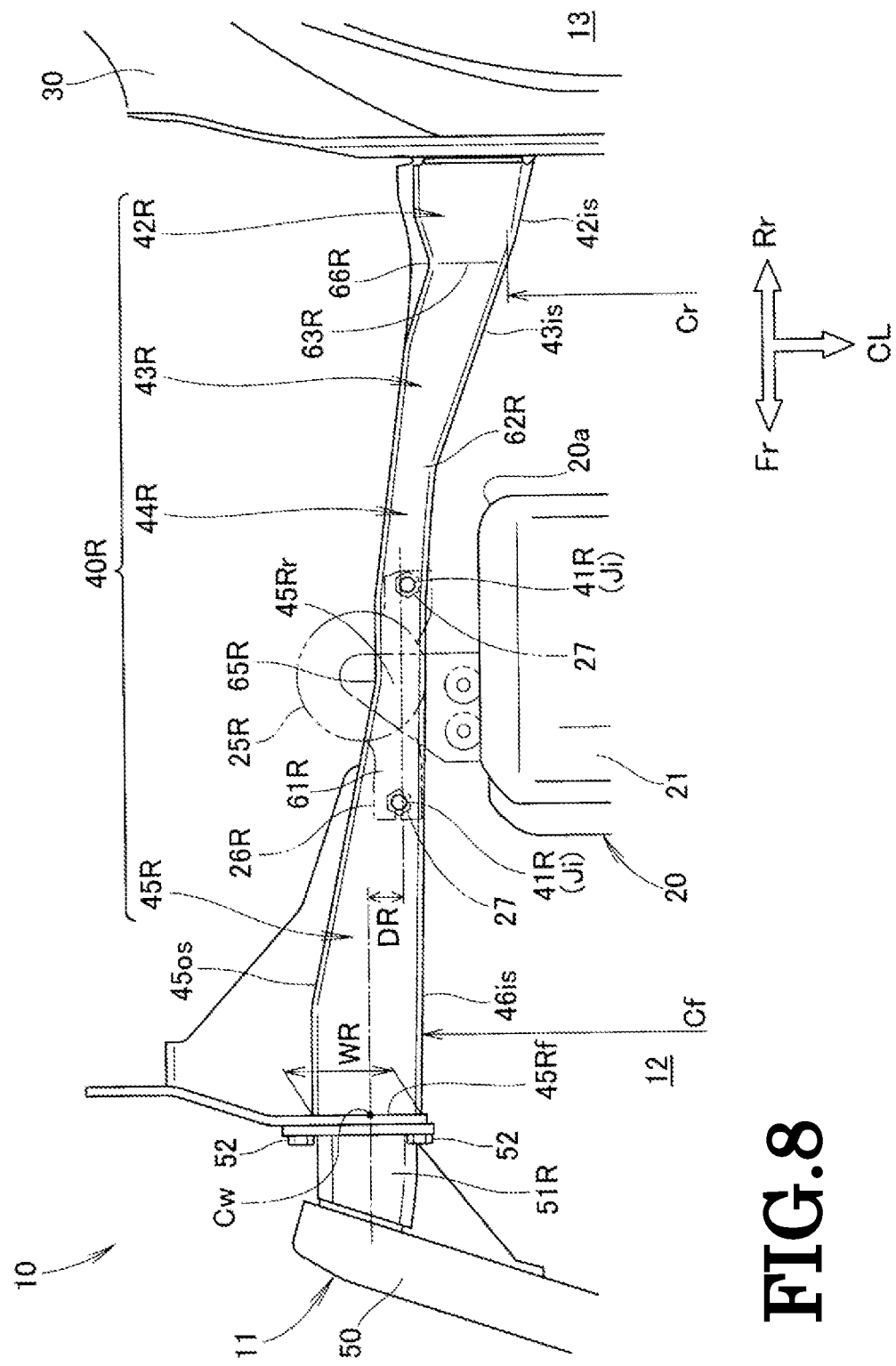
FIG. 8 is an enlarged view of the right front side frame shown in FIG. 2.
Figure 9A:
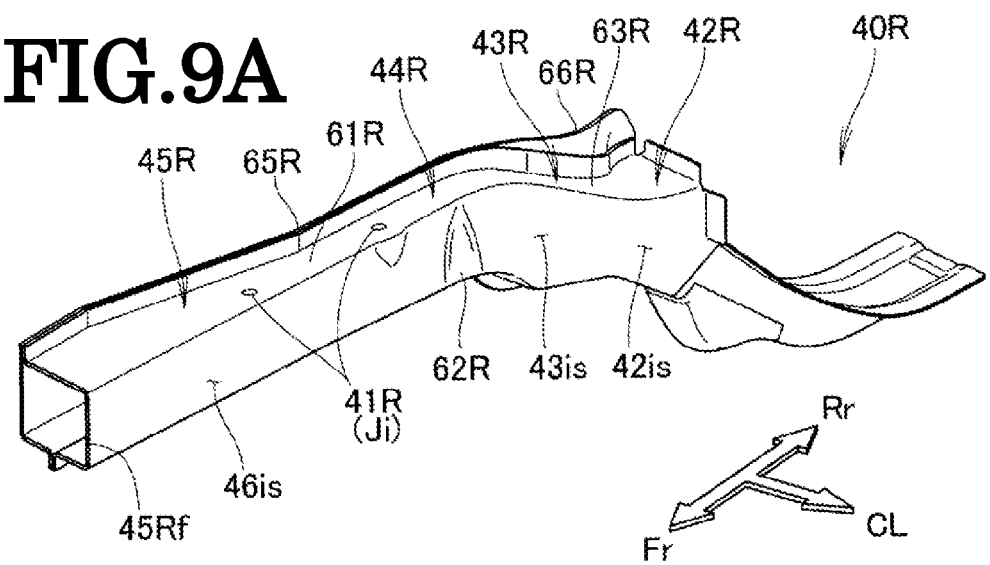
FIGS. 9A-9C show configurations of the right front side frame alone shown in FIG. 8 including a configuration resulting when seen from an inner side in a vehicle's width direction and the front, a configuration resulting when seen from above, and a configuration resulting when seen from an outer side in the vehicle's width direction.
Figure 9B:
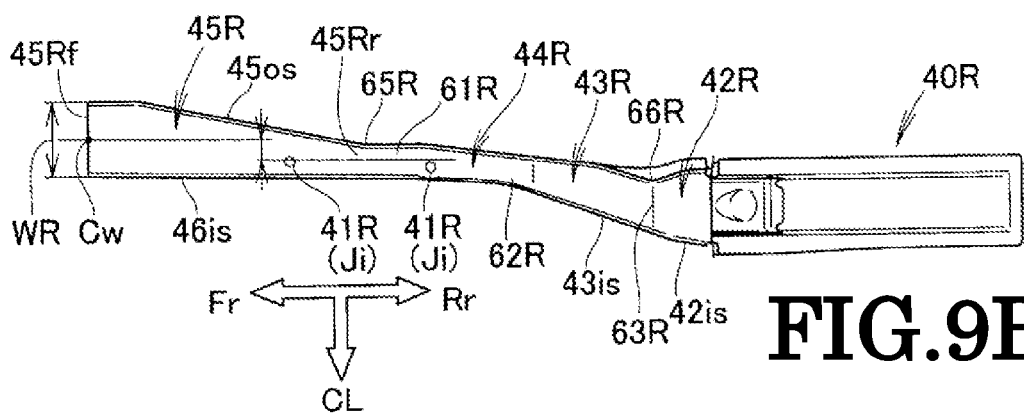
Figure 9C:
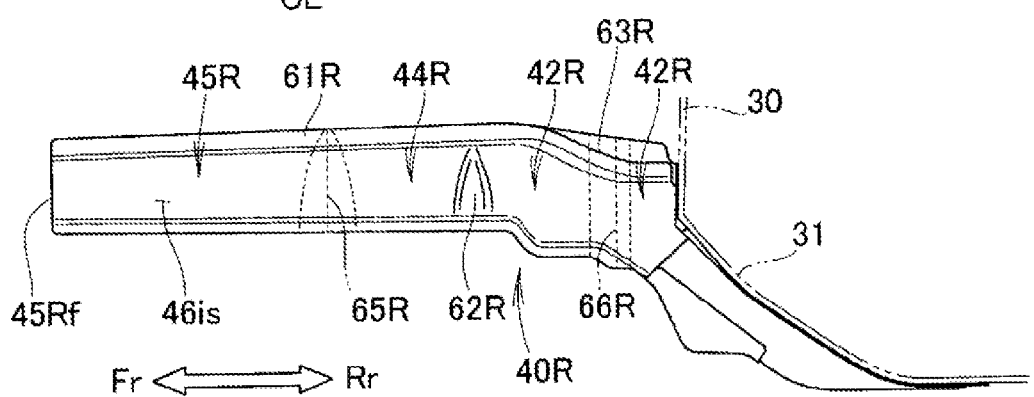

FIG. 8 is an enlarged view of the right front side frame 40R shown in FIG. 2. FIG. 9A is a perspective view of the right front side frame 40R alone shown in FIG. 8 that results when seen from an inner side in the vehicle's width direction and the front. FIG. 9B is an overall plan view of the right front side frame 40R shown in FIG. 8. FIG. 9C is a side view of the right front side frame 40R shown in FIG. 9B that results when seen from an inner side in the vehicle's width direction.

As shown in FIGS. 8 and 9A, 9B, 9C, the right front side frame 40L includes a right proximal end portion 42R that is joined to the dashboard lower panel 30, a right rear end portion 43R that extends from a front end of the right proximal end portion 42R towards the front of the vehicle body 11, a right middle portion 44R that extends from a front end of the right rear end portion 43R towards the front of the vehicle body 11, and a right front end portion 45R that extends from a front end of the right middle portion 44R towards the front of the vehicle body 11.

The rigidity of the right rear end portion 43R is set to be smaller than the rigidity of the right proximal end portion 42R. The rigidity of the right middle portion 44R is set to be smaller than those of the right proximal end portion 42R, the right rear end portion 43R and the right front end portion 45R. Namely, the right proximal end portion 42R and the right rear end portion 43R constitute a rear high rigid portion. The right front end portion 45R constitutes a front high rigid portion. The right middle portion 44R constitutes a low rigid portion.

To describe this in detail, the right proximal end portion 42R is joined to the front surface of the lower end portion 31 (refer to FIG. 9C) of the dashboard lower panel 30 and extends towards the rear of the vehicle body 11 while being inclined rearwards and downwards along the lower end portion 31. An inner side surface 42is of the right proximal end portion 42R in the vehicle's width direction is inclined outwards in the vehicle's width direction as it extends from a rear end towards the front of the vehicle body 11.

The right rear end portion 43R is inclined outwards in the vehicle's width direction as it extends from the right proximal end portion 42R towards the front of the vehicle body 11. Hereinafter, the right rear end portion 43R will be referred to as a "right inclined portion 43R" as required.

An inner side surface 46is of the right front side frame 40R in the vehicle's width direction that extends from a front end of the right inclined portion 43R to a front end 45Rf of the right front end portion 45R is formed into a straight flat plate that substantially (basically) continues in the longitudinal direction of the vehicle body. A space Cf (refer to FIG. 2) defined between the left and right side surfaces 46is, 46is is greater than a width of the power unit 20.

The front end 45Rf of the right front end portion 45R is situated at a front end of the right front side frame 40R. As has been described above, the right front end portion 45R extends from the front end 45Rf of the right front side frame 40R to a front end of the right middle portion 44R. An outer side surface 45os of the right front end portion 45R in the vehicle's width direction is inclined outwards in the vehicle's width direction as it extends from a rear end 45Rr of the right front end portion 45R, that is, a front end of the right middle portion 44R towards the front of the vehicle body 11. Consequently, a width WR (a transverse width WR) of the right front end portion 45R increases gradually of the right front end portion 45R extends from the rear end 45Rr towards the front of the vehicle body 11.

The right middle portion 44R lies adjacent to the rear end 45Rr of the right front end portion 45R as described above. The right middle portion 44R is the portion whose rigidity is lower than that of the right front end portion 45R as described above. Hereinafter, the right middle portion 44R will be referred to as a "right adjacent portion 44R" as required.

As shown in FIGS. 2, 5 and 8, the front bumper beam 50 is stretched between front ends 45Lf, 45Rf of the left and right front side frames 40L, 40R and is then attached thereto. To described this in detail, left and right extensions 51L, 51R, which extend towards the rear of the vehicle body 11, are provided at longitudinal end portions of the front bumper beam 50. Rear end portions of the left and right extensions 51L, 51R are superposed on the front ends 45Lf, 45Rf of the left and right front end portions 45L, 45R, that is, the front ends 45Lf, 45Rf of the left and right front side frames 40L, 40R and are then attached thereto with bolts 52. Thus, the longitudinal end portions of the front bumper beam 50 are attached to the front ends 45Lf, 45Rf of the left and right front end portions 45L, 45R.

Left and right attaching positions of the front bumper beam 50 to the left and right front side frames 40L, 40R are set at width centers Cw, Cw (widthwise centers Cw, Cw in the vehicle's width direction) of the front ends 45Lf, 45Rf of the left and right front end portions 45L, 45R. Hereinafter, the respective width centers Cw, Cw of the front ends 45Lf, 45Rf of the left and right front end portions 45L, 45R will be referred to as "left and right attaching positions Cw, Cw of the front bumper beam 50 to the left and right front side frames 40L, 40R" as required. In the left and right front side frames 40L, 40R, the left and right attaching positions Cw, Cw are offset outwards in the vehicle's width direction by offset amounts DL, DR with respect to left and right fastening positions Ji, Ji (the positions of the left and right bolt holes 41L, 41L, 41R, 41R) where the left and right mounting brackets 26L, 26R are fastened with bolts.

As shown in FIGS. 2, 5 and 8, at least portions of inner side surfaces 43is, 43is of the left and right inclined portions 43L, 43R in the vehicle's width direction overlap the power unit 20 in the longitudinal direction of the vehicle body when seen from the front of the vehicle body 11. For example, a space Cr (refer to FIG. 2) between the side surfaces 43is, 43is at rear ends of the left and right inclined portions 43L, 43R is set to be smaller than the width of the power unit 20.

As shown in FIGS. 2, 5 and 8, the left and right front side frames 40L, 40R have at least three left and right bending portions including left and right front bending portions 61L, 61R, left and right middle bending portions 62L, 62R and left and right rear bending portions 63L, 63R. The left and right middle bending portions 62L, 62R are situated spaced apart to the rear from the left and right front bending portions 61L, 61R. The left and right rear bending portions 63L, 63R are situated spaced apart to the rear from the left and right middle bending portions 62L, 62R.

To described this in detail, the left and right front bending portions 61L, 61R are restraint sections that can restrain the power unit 20 by holding it from both sides thereof in the vehicle's width direction while absorbing collision energy by being bent inwards in the vehicle's width direction by means of a collision load fs (refer to FIG. 2) that is exerted on a front end of the vehicle body 11 from the front, that is, a so-called frontal collision load fs.

The left and right front bending portions 61L, 61R are set on the left and right front side frames 40L, 40R in the fastening positions Ji, Ji where the left and right mounting brackets 26L, 26R of the left and right mount portions 25L, 25R are fastened with the bolts or positions lying in the vicinity of the fastening positions Ji, Ji.

To describe this in greater detail, the left and right front bending portions 61L, 61R are situated at boundaries between the left and right high rigid front end portions 45L, 45R and the left and right low rigid adjacent portions 44L, 44R.

The left and right rear bending portions 63L, 63R are situated further inwards in the vehicle's width direction than the left and right front bending portions 61L, 61R. For example, the space Cr between the inner surfaces 43is, 43is at the rear ends of the left and right inclined portions 43L, 43R is set smaller than the space Cf between the left and right side surfaces 46is, 46is (Cr<Cf). The left and right rear bending portions 63L, 63R are energy absorbing sections that can absorb the collision energy by being bent outwards in the vehicle's width direction by means of the frontal collision load fs and struck by the power unit 20 that has receded together with the left and right front bending portions 61L, 61R by means of the frontal collision load fs.

The left and right rear bending portions 63L, 63R are situated at boundaries between the left and right proximal end portions 42L, 42R and the left and right inclined portions 43L, 43R, that is, in the middle of the rear portions whose rigidities are higher than those of the left and right adjacent portions 44L, 44R.

As shown in FIGS. 6, 7 and 9, the left and right front side frames 40L, 40R have left and right front vertical grooves 65L, 65R and left and right rear vertical grooves 66L, 66R that are formed on outer side surfaces thereof in the vehicle's width direction. The left and right front bending portions 61L, 61R are portions of the left and right front side frames 40L, 40R that are formed brittle by providing the left and right front vertical grooves 65L, 65R. The left and right rear bending portions 63L, 63R are portions of the left and right front side frames 40L, 40R that are formed brittle by providing the left and right rear vertical grooves 66L, 66R.

The left and right front vertical grooves 65L, 65R and the left and right rear vertical grooves 66L, 66R can exhibit a notch effect. Therefore, in the left and right front side frames 40L, 40R, the positions of the left and right front bending portions 61L, 61R and the left and right rear bending positions 63L, 63R can be properly set. Then, the left and right front bending portions 61L, 61R and the left and right rear bending portions 63L, 63R can be properly bent by means of the collision load fs with the respective vertical grooves 65L, 65R, 66L, 66R acting as triggers (bending initiating points). Moreover, the bending can be realized only by the simple configuration of forming the vertical grooves 65L, 65R, 66L, 66R on the left and right front side frames 40L, 40R.

The left and right middle bending portions 62L, 62R are situated between the left and right front bending portions 61L, 61R and the left and right rear bending portions 63L, 63R, that is, at boundaries between the left and right inclined portions 43L, 43R and the left and right adjacent portions 44L, 44R. The left and right middle bending portions 62L, 62R are bending assistance sections that can bent outwards in the vehicle's width direction so as to allow the bending of the left and right front bending portions 61L, 61R and the left and right rear bending portions 63L, 63R. Namely, the left and right middle bending portions 62L, 62R are bent outwards in the vehicle's width direction when the left and right front bending portions 61L, 61R are bent inwards in the vehicle's width direction by means of the frontal collision load fs.

Figure 10:
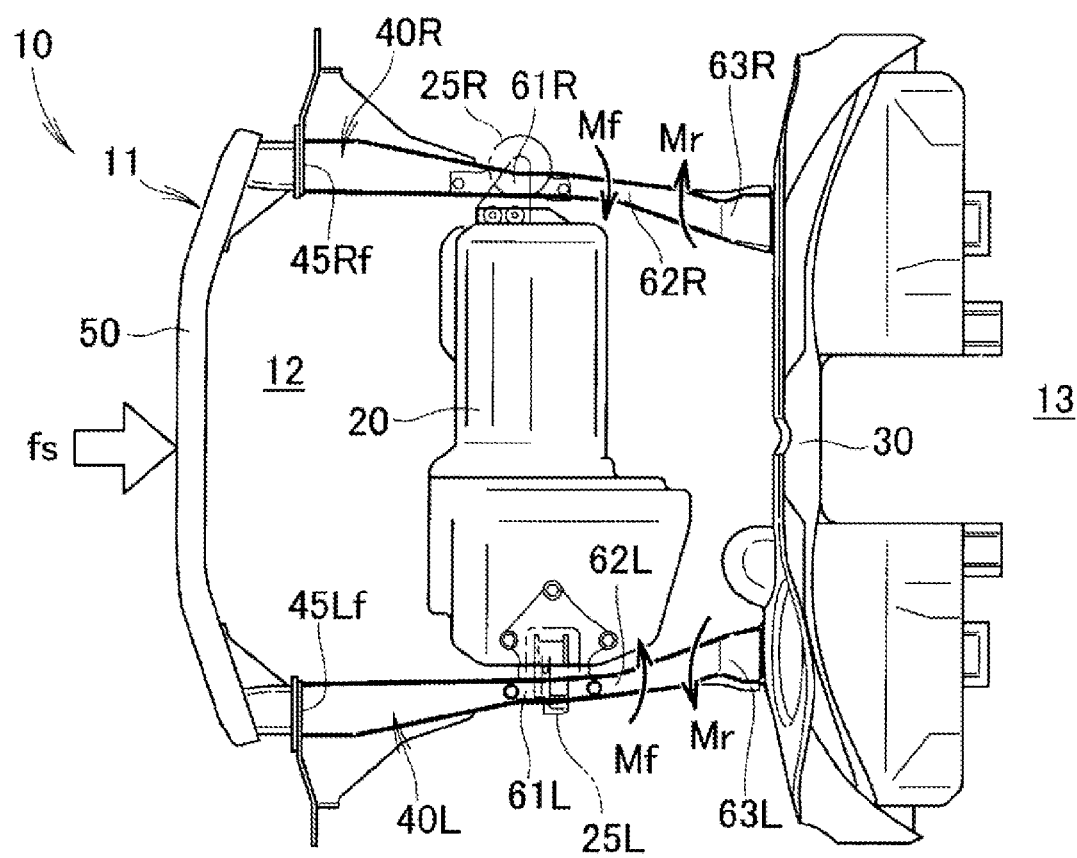
FIG. 10 is an explanatory diagram of a state in which a collision load is exerted on a front end of the vehicle body shown in FIG. 2 from the front.

Next, the function of the vehicle body front structure configured in the way described above will be described. FIG. 10 schematically shows the front portion of the vehicle body 10 shown in FIG. 2. As shown in FIGS. 2 and 10, the front bumper beam 50 is stretched between the front ends 45Lf, 45Rf of the left and right front side frames 40L, 40R and is then attached thereto. This enables the front bumper beam 50 to restrict the transverse displacement of the front ends 45Lf, 45Rf.

The collision load fs (the so-called frontal collision load fs) exerted on the front end of the vehicle body 11, that is, the front bumper beam 50 from the front is transmitted from both the end portions of the front bumper beam 50 to the front ends 45Lf, 45Rf of the left and right front side frames 40L, 40R.

The left and right attaching positions Cw, Cw (refer to FIG. 2) of the front bumper beam 50 to the left and right front side frames 40L, 40R are offset outwards in the vehicle's width direction with respect to the left and right front bending portions 61L, 61R (refer to FIG. 10), that is, the left and right fastening positions Ji, Ji. Therefore, the points of application of the frontal collision load fs to the left and right front bending portions 61L, 61R (the left and right attaching positions Cw, Cw) are offset outwards in the vehicle's width direction. Consequently, the left and right front bending portions 61L, 61R can be properly bent as to project inwards in the vehicle's width direction by means of the frontal collision load fs. Moreover, even though the power unit 20 is positioned so as to be offset to lie nearer to the dashboard lower panel 30 with respect to the overall length of the left and right front side frames 40L, 40R, the left and right front bending portions 61L, 61R are properly bent inwards in the vehicle's width direction by means of the collision load fs.

Therefore, bending moments Mf, Mf (front bending moments Mf, Mf) are generated in the left and right fastening positions Ji, Ji, that is, the left and right front bending portions 61L, 61R so as to bend them in such a way as to project inwards in the vehicle's width direction as shown in FIG. 10.

In addition, as shown in FIGS. 2 and 10, the left and right rear bending portions 63L, 63R are situated inwards of (offset with respect to) the left and right front bending portions 61L, 61R in the vehicle's width direction. Consequently, the left and right rear bending portions 63L, 63R can be properly bent outwards in the vehicle's width direction by means of the frontal collision load fs. Therefore, bending moments Mr, Mr (rear bending moments Mr, Mr) are generated in the left and right rear bending portions 63L, 63R in directions in which the left and right rear bending portions 63L, 63R are bent outwards in the vehicle's width direction as shown in FIG. 10.

Figure 11:
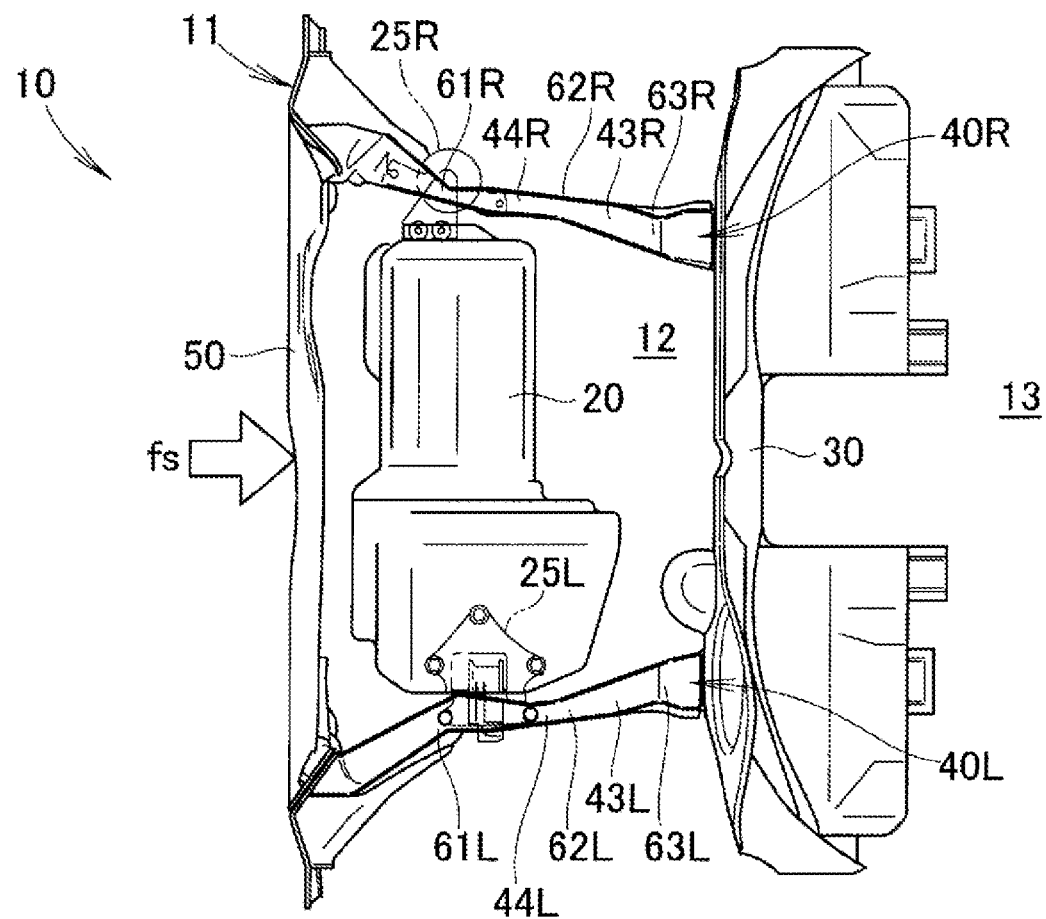
FIG. 11 is an explanatory diagram of a process of the vehicle body shown in FIG. 10 being bent outwards in the vehicle's width direction by the collision load.

As a result, as shown in FIG. 11, the left and right front bending portions 61L, 61R start to bend so as to project inwards in the vehicle's width direction. The left and right adjacent portions 44L, 44R (the left and right middle portions 44L, 44R) start to bend outwards in the vehicle's width direction with the left and right front bending portions 61L, 61R acting as initiating points. The left and right inclined portions 43L, 43R start to bend outwards in the vehicle's width direction with the left and right rear bending portions 63L, 63R acting as initiating points. As this occurs, the front bumper beam 50 is elongated in the longitudinal direction thereof by the frontal collision load fs to such an extent that the generation of the front and rear bending moments Mf, Mf, Mr, Mr (refer to FIG. 10) is not disturbed.

Figure 12:
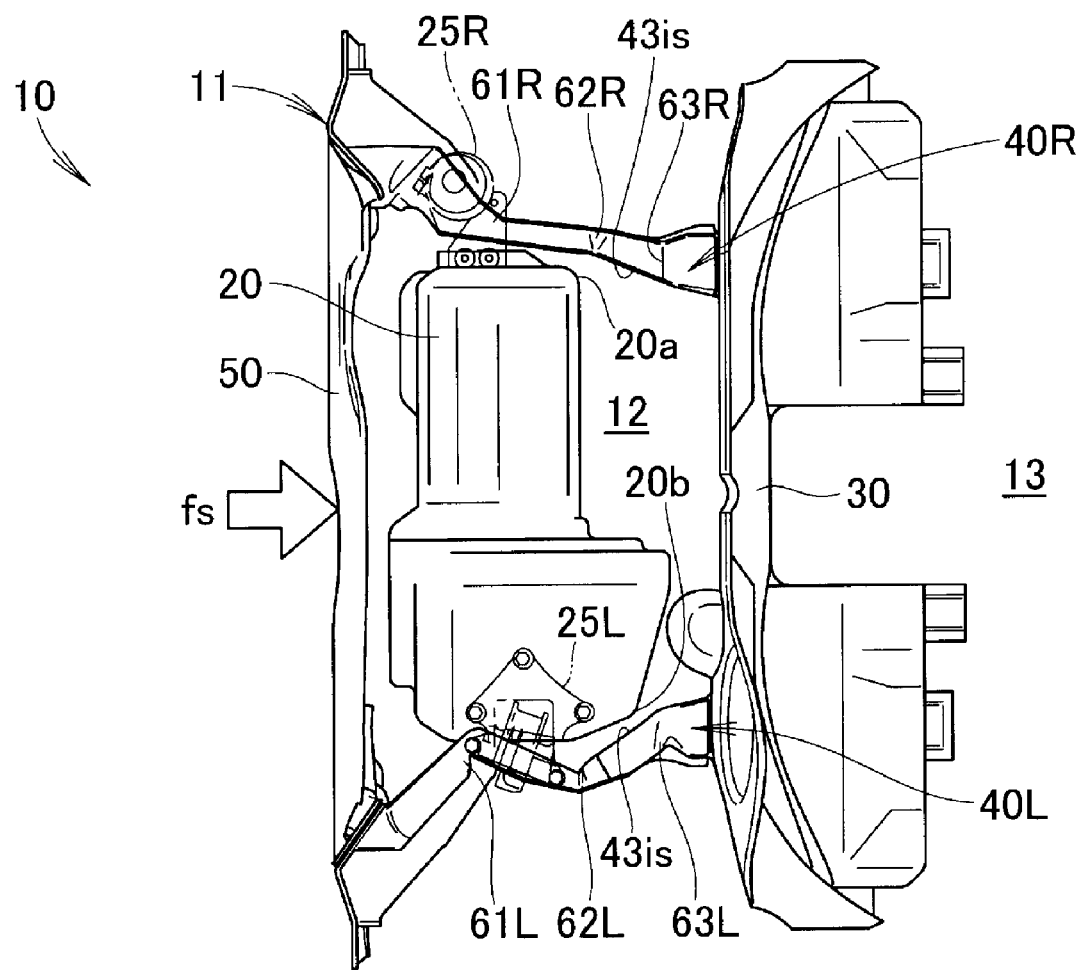
FIG. 12 is an explanatory diagram of a state in which the vehicle body shown in FIG. 11 restrains a power unit by holding it from both sides thereof in the vehicle's width direction.

As shown in FIG. 12, the left and right front bending portions 61L, 61R are bent in such a way as to project inwards in the vehicle's width direction to eventually restrain the power unit 20 by holding it from both the sides thereof in the vehicle's width direction. The power unit 20 can be properly restrained by being held from both the sides thereof in the vehicle's width direction by the left and right front bending portions 61L, 61R. Consequently, the moment produced by the frontal collision load fs to attempt to rotate the power unit 20 to the left or right direction relative to the left and right front side frames 40L, 40R can be suppressed by the left and right front bending portions 61L, 61R.

The time spent from the point in time when the frontal collision load fs is exerted on the front end of the vehicle body 11 until the left and right front bending portions 61L, 61R hold the power unit 20 to restrain it is referred to as an initial stage of the collision. In the initial stage of the collision, the front portions of the left and right front side frames 40L, 40R are deformed plastically, whereby the power unit 20 can be properly moved towards the rear of the vehicle body 11 accordingly as the front portions of the left and right front side frames 40L, 40R are deformed while absorbing the collision energy. The left and right mount portions 25L, 25R are deformed or broken in the midst of bending of the left and right front bending portions 61L, 61R.

Figure 13:
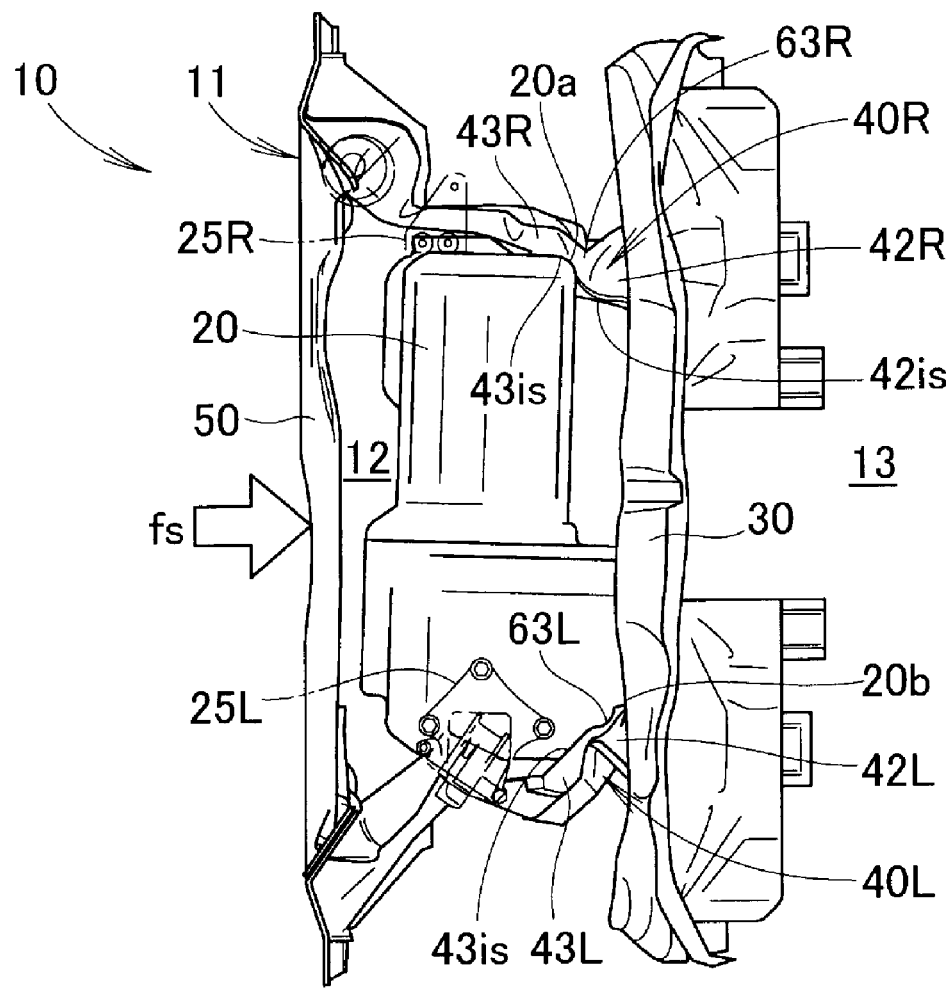
FIG. 13 is an explanatory diagram of a state in which the power unit shown in FIG. 12 strikes a dashboard lower panel.

Thereafter, the left and right front bending portions 61L, 61R and the left and right middle bending portions 62L, 62R are deformed to the rear while being deformed outwards in the vehicle's width direction by means of the frontal collision load fs. As has been described above, at least the portions of the inner side surfaces 43*is*, 43*is* of the left and right inclined portions 43L, 43R in the vehicle's width direction overlap the power unit 20 in the longitudinal direction of the vehicle body. Therefore, the power unit 20 is moved rearward together with the left and right front bending portions 61L, 61R to thereby strike the inner side surfaces 42*is*, 42*is* of the left and right proximal end portions 42L, 42R in the vehicle's width direction and the inner side surfaces 43*is*, 43*is* of the left and right inclined portions 43L, 43R in the vehicle's width direction, whereby the left and right proximal end portions 42L, 42R and the left and right inclined portions 43L, 43R are collapsed, as shown in FIG. 13. Namely, in the late stage of the collision, the rear portions of the left and right front side frames 40L, 40R are deformed plastically, thereby making it possible to absorb the collision energy more.

Thus, left and right rear ends 20*a*, 20*b* of the power unit 20 that is moved rearward by means of the frontal collision load fs strike the left and right inclined portions 43L, 43R, thereby making it possible to allow the left and right rear bending portions 63L, 63R to be properly bent outwards in the vehicle's width direction. Then, rear portions of the left and right front side frames 40L, 40R are collapsed by the power unit 20 that is moved rearward, thereby making it possible to absorb the collision energy sufficiently. Consequently, the collision energy absorbing performance by the rear portions of the left and right front side frames 40L, 40R can be enhanced. As a result, in a late stage of the collision, the deformation amount by which the dashboard lower panel 30 is deformed into the passenger compartment 13 can be properly reduced.

FIGS. 14A, 14B, 14C show a process of the right rear end portion 20*a* of the power unit 20 shown in FIG. 12 collapsing the right rear bending portion 63R and the vicinity thereof. The power unit 20 shown in FIG. 14A moves the vehicle body 11 to the rear and reaches a state shown in FIG. 14C by way of a state shown in FIG. 14B. As a result of this, the right rear end portion 20*a* of the power unit 20 strikes the inner side surface 42*is* of the right proximal end portion 42R in the vehicle's width direction and the inner side surface 43*is* of the right inclined portion 43R in the vehicle's width direction to thereby collapse the right proximal end portion 42R and the right inclined portion 43R, thereby making it possible to absorb the collision energy. This can reduce the collision energy produced when the power unit 20 strikes the dashboard lower panel 30.

FIGS. 14D, 14E show a process of the left rear end portion 20*b* of the power unit 20 shown in FIG. 12 collapsing the left rear bending portion 63L and the vicinity thereof. The power unit 20 shown in FIG. 14D moves the vehicle body 11 to the rear and reaches a state shown in FIG. 14E. As a result of this, the left rear end portion 20*b* of the power unit 20 strikes the inner side surface 42*is* of the left proximal end portion 42L in the vehicle's width direction and the inner side surface 43*is* of the left inclined portion 43L to thereby collapse the left proximal end portion 42L and the left inclined portion 43L, thereby making it possible to absorb the collision energy. This can reduce the collision energy produced when the power unit 20 strikes the dashboard lower panel 30.

Consequently, it is possible to properly restrain the dashboard lower panel 30 from being deformed into the passenger compartment 13. It is possible to enhance further the occupant protection performance by ensuring the space inside the passenger compartment 13. Moreover, it is possible to absorb the collision energy sufficiently by the vehicle body with the simple configuration that has the left and right front bending portions 61L, 61R, the left and right middle bending portions 62L, 62R and the left and right rear bending portions 63L, 63R on the left and right front side frames 40L, 40R.

Further, as shown in FIG. 2, the mount portions 25L, 25R of the power unit 20 are situated in the different positions in the longitudinal direction of the vehicle body. As this occurs, the left and right mount portions 25L, 25R are mounted on the left and right front side frames 40L, 40R in the different positions. As a result, the bending rigidities of the left and right front side frames 40L, 40R can differ from each other.

In contrast with this, in the example, in the initial stage of the collision, the front portions of the left and right front side frames 40L, 40R hold the power unit 20 from both the sides thereof in the vehicle's width direction to restrain the power unit 20, allowing the power unit 20 to move towards the rear of the vehicle body 11. Thereafter, in the late stage of the collision, the rear portions of the left and right front side frames 40L, 40R are deformed plastically by the power unit 20 that is moved rearward to strike it. Therefore, although the bending rigidities of the left and right front side frames 40L, 40R differ from each other, the deformation amount by which the dashboard lower panel 30 is deformed into the passenger compartment 13 can be properly reduced.

INDUSTRIAL APPLICABILITY

The vehicle body structure of the invention is preferable to be applied to a passenger vehicle having a power unit compartment 12 at a front portion of a vehicle body 11.

DESCRIPTION OF REFERENCE NUMERALS AND CHARACTERS 10 wheeled vehicle
11 vehicle body
12 power unit compartment
13 passenger compartment
20 power unit
25L, 25R mount portion
26L, 26R mounting bracket
27 bolt
30 dashboard lower panel
40L, 40R front side frame
42L, 42R proximal end portion
42is inner side surface in vehicle's width direction
43L, 43R rear end portion (inclined portion)
43is inner side surface in vehicle's width direction
44L, 44R middle portion (adjacent portion)
45L, 45R front end portion
45Lf front end (front end of front side frame)
45Lr rear end
45os outer side surface in vehicle's width direction
46is inner side surface in vehicle's width direction from front end of inclined portion to front end of front end portion
50 front bumper beam
61L, 61R front bending portion
62L, 62R middle bending portion
63L, 63R rear bending portion
65L, 65R left and right front vertical groove
66L, 66R left and right rear vertical groove
Cw left and right attaching positions of front bumper beam
fs frontal collision load
Ji fastening position
WL, WR width of front end portion

The invention claimed is:

1. A vehicle body front structure, comprising:
a dashboard lower panel that separates a power unit compartment defined at a front portion of a vehicle body so as to accommodate a power unit from a passenger compartment which is situated directly behind the power unit compartment;
left and right front side frames that extend to the front of the vehicle body from the dashboard lower panel, and that enable to mount the power unit thereon by means of left and right mount portions; and
a front bumper beam that is attached to stretch between front ends of the left and right front side frames,
wherein the left and right front side frames have at least three left and right bending portions including left and right front bending portions, left and right middle bending portions which are situated spaced apart to the rear from the left and right front bending portions, and left and right rear bending portions which are situated spaced apart to the rear from the left and right middle bending portions,
the left and right front bending portions are restraint sections that enable to restrain the power unit by holding the power unit from both sides thereof in a vehicle's width direction while absorbing collision energy by being bent to project inwards in the vehicle's width direction by means of a collision load exerted on a front end of the vehicle body from the front,
the left and right rear bending portions are energy absorbing sections that enable to absorb the collision energy by being bent outwards in the vehicle's width direction by means of the collision load and being struck by the power unit which is moved rearward together with the left and right front bending portion by means of the collision load, and
the left and right middle bending portions are bending assistance sections that enable to be bent outwards in the vehicle's width direction so as to allow the bending of the left and right front bending portions and the left and right rear bending portions.

2. The vehicle body front structure according to claim 1, wherein the left and right front bending portions are set at fastening positions of the left and right front side frames where left and right mounting brackets of the left and right mount portions are fastened with a bolt or are set in the vicinity of the fastening positions, and
left and right attaching positions of the front bumper beam which is attached to the left and right side frames are offset outwards in the vehicle's width direction with respect to the left and right fastening positions.

3. The vehicle body front structure according to claim 2, wherein the left and right front side frames include left and right front end portions which extend from front ends to the fastening positions or to the vicinity of the fastening positions, and left and right adjacent portions which lie adjacent to rear ends of the left and right front end portions and which are less rigid than the left and right front end portions,
the left and right front bending portions are situated at boundaries between the left and right front end portions and the left and right adjacent portions,
outer side surfaces of the left and right front end portions in the vehicle's width direction are inclined outwards in the vehicle's width direction as they extend from rear ends of the left and right front end portions towards the front of the vehicle body, whereby widths of the left and right front end portions gradually increase from the rear ends of the left and right front end portions towards the front of the vehicle body, and
the left and right front attaching positions of the front bumper beam are set individually at widthwise centers of front ends of the left and right front end portions.

4. The vehicle body front structure according to claim 1, wherein the left and right front side frames include left and right proximal end portions which are joined to the dashboard lower panel, and left and right inclined portions which are inclined outwards in the vehicle's width direction as they extend from the left and right proximal end portions towards the front of the vehicle body,
at least a part of inner side surfaces of the left and right inclined portions in the vehicle's width direction overlaps the power unit in a longitudinal direction of the vehicle body as seen from the front of the vehicle body, and the left and right rear bending portions are situated at boundaries between the left and right proximal end portions and the left and right inclined portions.

5. The vehicle body front structure according to claim 1, wherein the left and right front side frames have vertical grooves which are formed on outer side surfaces of the left and right front side frames in the vehicle's width direction, and the left and right front bending portions and the left and right rear bending portions are sections formed brittle by the vertical grooves of the left and right front side frames.

\* \* \* \* \*